United States Patent Office 3,462,461
Patented Aug. 19, 1969

3,462,461
PURIFICATION OF PHTHALIC ANHYDRIDE
Thomas A. Bloom, Park Forest, and Vernon W. Blue, Calumet City, Ill., assignors to The Sherwin-Williams Company, Cleveland, Ohio, a corporation of Ohio
No Drawing. Filed Oct. 6, 1966, Ser. No. 584,671
Int. Cl. C07c 63/18, 51/44
U.S. Cl. 260—346.7            10 Claims

ABSTRACT OF THE DISCLOSURE

Crude phthalic anhydride containing naphthoquinone-type impurities is purified by heating it in a molten state with a polyunsaturated fatty animal or vegetable oil or a polyunsaturated fatty acid or hydrocarbon obtained from such oil for a period of time sufficient to reduce color forming impurities when the phthalic anhydride is subsequently distilled. Thereafter the phthalic anhydride is distilled from the resultant mixture.

---

This invention relates to the purification of phthalic anhydride, and more particularly to the treatment of phthalic anhydride to reduce or inhibit color formation.

One of the problems in the preparation of phthalic anhydride is the minimizing of color formation. Phthalic anhydride containing colored bodies is not satisfactory for many uses.

In the preparation of phthalic anhydride, for example, by the catalytic oxidation of naphthalene, the crude phthalic anhydride obtained will usually contain some impurities, such as naphthoquinones, especially 1,4-naphthoquinone, maleic anhydride, benzoic acid and dark colored materials. Various purification processes have been employed in an effort to eliminate these impurities and especially the color forming impurities. Thus, U.S. Patent 2,510,852, describes a process in which butene-1,4-dioic acids and anhydrides thereof are added to crude phthalic anhydride containing naphthoquinone-type impurities and the resultant mixture is heated to a temperature above the melting point of the crude phthalic anhydride whereby the impurities are converted to removable form and the purified phthalic anhydride is recovered by volatilization. Maleic anhydride is the preferred additive. The patentees point out that even though maleic anhydride is produced as a by-product in the synthesis of phthalic anhydride, the amount present is not sufficient for color purification in all cases, especially when the phthalic anhydride is made by a catalytic oxidation with an air-naphthalene vapor ratio exceeding about 30:1, and/or by cooling the hot gases from an oxidation, to about 65° C. or higher.

One of the objects of the present invention is to provide a new and improved process for purifying crude phthalic anhydride which is very effective and involves the use of readily available materials. Other objects will appear hereinafter.

In accordance with the invention it has been found that the quality of crude phthalic anhydride can be improved by mixing the crude phthalic anhydride with a small amount, e.g., a fraction of one percent by weight, of a polyunsaturated compound capable of undergoing the Diels-Alder reaction and heating the mixture for a period of time in its molten state before removing the phthalic anhydride by volatilization. The additive compound employed can be, for example, a polyunsaturated animal or vegetable oil, a polyunsaturated acid of such oil, or a polyunsaturated hydrocarbon, or mixtures embodying two or more of such oils, acids or hydrocarbons. To be effective for the purpose of the invention, the additive compound apparently should have at least two olefinic double bonds in an acyclic hydrocarbon chain.

Examples of pure compounds which can be employed in the practice of the invention are linoleic acid, linolenic acid, eleostearic acid, squalene and carotene. Examples of oils which can be employed are linseed, soybean, tung, dehydrated castor, oiticica and safflower.

Apparently polyunsaturated compounds of the type described react with impurities, such as 1,4-nathpthoquinone present in the crude pehthalic anhydride to form Diels-Alder adducts of very low volatility and high molecular weight which will remain in the still as a tar when the treated crude phthalic anhydride is distilled. If a conjugated double bond system is not present as such in the additive, it can be formed by rearrangement during the heat treating period. It appears to be essential, however, that the additive contain at least two carbon-to-carbon double bonds. Additives containing only one carbon-to-carbon double bond, such as oleic acid, acrylic acid and 2-ethylhexylacrylate, do not work as well as additives containing multiple unsaturation, presumably because they are not capable of undergoing a Diels-Alder-type of condensation.

The amount of the additive and the conditions used are subject to some variation but generally, in order to obtain good quality phthalic anhydride, it is desirable to employ at least 0.05% by weight of the additive at a temperature in excess of 230° C. The preferred quantity is around 0.1% by weight of the additive based on the total weight of the crude phthalic anhydride at a temperature of 260° C. for about sixteen hours. The upper limit of the temperature employed usually does not exceed 280° C. because at higher temperatures a more rapid rate of decarboxylation occurs. Especially good results have been obtained by employing tung oil.

The period of time for the heat treatment of the molten crude phthalic anhydride containing the additive should be sufficiently long to effect removal of color forming impurities when the phthalic anhydride is subsequently distilled.

It is considered that phthalic anhydride having a melt color of not over 20, preferably 10 to 15, and a heat color of 40 or less, is of good quality. The color is measured in APHA color units using ASTM method D2280–64T. The heat color is measured after holding the phthalic anhydride at 250° C. for 90 minutes.

The following table illustrates the results obtained with various additives in the purification of phthalic anhydride by mixing 0.1% by weight of the additive with crude phthalic anhydride, heat treating the mixture at 260° C. and atmospheric pressure for sixteen hours, and thereafter distilling the phthalic anhydride.

The phthalic anhydride was obtained in a conventional commercial process by the oxidation of naphthalene.

The distillation procedure was conventional for the distillation of molten phthalic anhydride, the temperature of the molten phthalic anhydride being around 200° C. at 80–100 mm. pressure.

TABLE

| Additive | Melt color (APHA units) | Heat color (APHA units) |
|---|---|---|
| Control (no additive) | Distillate comes over yellow | |
| Stearic acid | Distillate comes over yellow | |
| Oleic acid | 20 | 50 |
| Linoleic acid | 10 | 35 |
| Linolenic acid | 10 | 40 |
| Linseed oil | 15 | 35 |
| Gum rosin | 25 | 60 |
| Soya oil | 10 | 30 |
| Tung oil | 10 | 30 |
| Dehydrated castor oil | 5 | 15 |
| Squalene | 10 | 40 |
| Oiticica oil | 10 | 20 |
| Acrylic acid | 35 | 60 |
| 2-ethylhexyl acrylate | Distillate very yellow | |
| Safflower oil | 15 | 40 |
| Carotene | 10 | 25 |

It will be noted that the distillate came over very yellow when no additive was used and also when a saturated acid, such as stearic acid, was employed. Likewise, when an unsaturated compound containing only a single carbon-to-carbon double bond, such as 2-ethylhexyl acrylate, was used, the distillate was very yellow. Acrylic acid which likewise contains only a single carbon-to-carbon double bond, did not pass the quality test. Oleic acid did not pass the heat color test. Gum rosin did not pass either the melt color or the heat color test. However, all of the polyunsaturated compounds containing at least two carbon-to-carbon double bonds in an acyclic carbon chain gave products which passed the quality test.

By employing as an additive in the heat treatment a polyunsaturated compound of the type herein described, the heat treating cycle can be reduced from 36–40 hours to 16 hours.

The purification process is applicable to the treatment of crude phthalic anhydride produced by any conventional naphthalene oxidation process or by any other process where naphthoquinone-type impurities are formed.

The invention is hereby claimed as follows:

1. A process for the purification of crude phthalic anhydride containing naphthoquinone-type impurities which comprises mixing with the crude phthalic anhydride an effective amount of a polyunsaturated organic compound from the class consisting of linoleic acid, linolenic acid, eleostearic acid, squalene, carotene, linseed oil, soybean oil, tung oil, dehydrated castor oil, oiticica oil and safflower oil, said amount comprising at least 0.05% by weight of the resultant mixture, heating the mixture with the crude phthalic anhydride in a molten state for a period of time sufficient to reduce color forming impurities when the phthalic anhydride is subsequently distilled, and thereafter distilling the phthalic anhydride from said mixture.

2. A process as claimed in claim 1 in which said mixture is heated at a temperature in excess of 230° C. but below the temperature at which substantial decarboxylation of the phthalic anhydride begins to occur.

3. A process as claimed in claim 1 in which said mixture is heated at a temperature within the range of 230° C. to 280° C.

4. A process as claimed in claim 1 in which said mixture is heated at a temperature of about 260° C.

5. A process as claimed in claim 1 in which said mixture is heated at a temperature of about 260° C. for about 16 hours.

6. A process as claimed in claim 1 in which said polyunsaturated organic compound is a polyunsaturated vegetable oil.

7. A process as claimed in claim 1 in which said polyunsaturated organic compound is a polyunsaturated fatty acid.

8. A process as claimed in claim 1 in which said polyunsaturated organic compound is a polyunsaturated hydrocarbon.

9. A process as claimed in claim 1 in which said polyunsaturated organic compound is tung oil.

10. A process as claimed in claim 1 in which said polyunsaturated organic compound is tung oil, the amount employed is about 0.1% by weight of the mixture, the temperature employed is about 260° C. at atmospheric pressure, and the time of the heat treatment before distillation is about 16 hours.

References Cited

UNITED STATES PATENTS 2,033,131  3/1936  Ellis _____ 260—346.6
2,510,852  6/1950  Bailey et al. _____ 260—346.7

OTHER REFERENCES

Adams, Roger (editor), Organic Reactions, John Wiley & Sons, New York (1949), pp. 150–152 (volume V).

ALEX MAZEL, Primary Examiner

B. DENTZ, Assistant Examiner

U.S. Cl. X.R.
260—701